United States Patent [19]

Ault

[11] 4,454,692

[45] Jun. 19, 1984

[54] METAL DECK RACEWAY CONSTRUCTION

[75] Inventor: Robert L. Ault, Saltsburg, Pa.

[73] Assignee: Epic Metals Corporation, Rankin, Pa.

[21] Appl. No.: 316,682

[22] Filed: Oct. 30, 1981

[51] Int. Cl.³ ............................................... E04B 5/48
[52] U.S. Cl. ........................................ 52/221; 52/451
[58] Field of Search ................. 52/221, 448, 451, 801, 52/336; 174/48, 49; 220/3.3, 3.5

[56] References Cited

U.S. PATENT DOCUMENTS

| | | | |
|---|---|---|---|
| 1,718,253 | 6/1929 | Putnam . | |
| 1,778,145 | 10/1930 | Cumfer | 52/451 |
| 2,000,243 | 5/1935 | Manske | 72/46 |
| 2,073,490 | 3/1937 | Lewin | 247/3 |
| 3,303,264 | 2/1967 | Saul et al. | 174/48 |
| 3,417,191 | 12/1968 | Fork | 174/49 |
| 3,426,492 | 2/1969 | Fork | 52/221 |
| 3,426,802 | 2/1969 | Fork | 138/92 |
| 3,459,875 | 8/1969 | Fork | 174/97 |
| 3,592,956 | 7/1971 | Fork | 174/49 |
| 3,701,837 | 10/1972 | Fork | 174/50 |
| 3,721,051 | 3/1973 | Fork | 52/173 |
| 3,793,793 | 2/1974 | Dobbins | 52/221 |
| 3,886,702 | 6/1975 | Fork | 52/221 |
| 3,903,666 | 9/1975 | Fork | 52/221 |
| 3,932,696 | 1/1976 | Fork et al. | 174/48 |
| 4,010,314 | 3/1977 | Kohaut | 174/48 |
| 4,012,874 | 3/1977 | Brogan et al. | 52/221 X |
| 4,085,558 | 4/1978 | Albrecht | 52/451 |
| 4,178,469 | 12/1979 | Fork | 174/48 |
| 4,194,332 | 3/1980 | Fork | 52/220 |
| 4,232,493 | 11/1980 | Gray et al. | 52/221 |
| 4,297,524 | 10/1981 | Fork | 174/48 |
| 4,338,484 | 7/1972 | Littrell | 174/48 |

OTHER PUBLICATIONS

MAC-FAB, In-Floor Electrification Systems for Concrete and Steel Framing. (4 pp.), Catalog MF-520, 5 Color Photographs (A through E) - Littco Product.

*Primary Examiner*—Carl D. Friedman
*Attorney, Agent, or Firm*—Buell, Blenko, Ziesenheim & Beck

[57] ABSTRACT

A metal raceway structure for use in composite, concrete-metal construction including an elongated metal deck having alternating ribs and valleys. A sheet underlies the deck in order to define a plurality of cells. The metal deck has spaced first and second ribs of generally equal height and an interposed third rib of lesser height than the first and second ribs. The ribs may have a top wall and depending sidewalls. The first and second ribs have sidewall openings facing the third rib and the third rib has at least one top wall opening. This permits electrical wires passing through each of the three cells to emerge at a single location generally within the valley between the first and second ribs. A housing member is provided in overlying relationship with respect to the third rib and has openings permitting communication between the interior of the housing and the three cells. The housing may have one or more housing extensions containing electrical receptacles which are in communication with the housing interior, but in relatively nonobstructing position with respect thereto.

23 Claims, 10 Drawing Figures

METAL DECK RACEWAY CONSTRUCTION

BACKGROUND OF THE INVENTION

1. Field of the Invention

This invention relates to metal raceway constructions having independent cells for separate delivery of three types of utilities, such as electrical wires, to a single location in such a fashion as to facilitate ease of access to electrical utility lines.

2. Description of the Prior Art

The advantageous use of formed metal deck in combination with concrete in establishing floors and roofs for buildings and the like has long been known. In general, in such constructions an elongated metal deck member is provided with alternating ribs and valleys. The deck member is connected to associated deck members and is supported by suitable structural beams and the like. A layer of overlying concrete is poured onto the deck. When the concrete hardens, a composite action is created wherein the resultant structure has excellent tensile strength as a result of the metal deck and excellent compressive strength as a result of the presence of concrete.

In connection with such constructions it has been known to provide a sheet underlying the ribbed deck in order to define a series of elongated cells or raceways permitting passage of supply means for various utilities through such cells.

Among the utilities which pass through raceways are electrical wires provided for various purposes.

It has been known, in connection with general building construction concepts to provide divided compartments in walls or floors so as to separate different types of electrical supply from each other. See for example, U.S. Pat. Nos. 1,718,253; 2,000,243 and 3,793,793.

It has been known to provide under a concrete floor member, metal duct systems which contain or are adapted to contain electrical wires and are reached through the making of a hole in the duct system. See, for example, U.S. Pat. Nos. 2,073,490; 3,303,264; 3,592,956 and 3,721,051.

It has been known to provide holes in the sidewalls of adjacent rib members so as to permit access to wires through a valley disposed between the ribs. See, for example, U.S. Pat. Nos. 3,426,492 and 3,426,802.

U.S. Pat. No. 3,886,702 discloses a bottomless electrical cable trench wherein access is provided to certain wires through either openings in the top of a rib or in the sidewall.

U.S. Pat. No. 3,459,875 discloses, in one embodiment, access to multiple wires through bridging conduits connecting ribs and openings in the top of a rib or in another embodiment combinations of bridging conduits and sidewall openings.

U.S. Pat. No. 3,701,837 discloses access to electrical wires through two, rib-top openings and a valley containing a wire.

It has also been suggested to provide coverings for portions of the valley between two ribs in connection with provision of access to utility lines. See, for example, U.S. Pat. Nos. 3,417,191; 3,903,666; 3,932,696; 4,194,332 and 4,232,493.

It has also been known to provide a separate, elongated partitioned chamber interposed between deck sections and divided into three passageways. Access to each passageway is obtained by top entry through an overlying enclosure. An electrical receptacle is disposed within the enclosure. See Mac-Fab Products, Inc. Catalog MF-520. Such a construction requires use of a specially configured separate chamber and employs top access to the partitioned passageways.

It has also been known to subdivide a chamber into three compartments by means of upwardly projecting walls formed within a lower panel of a separate elongated member adapted to be interposed between deck sections. An overlying enclosure is partially received within a recess in the upper panel and communicates with the three compartments through openings in the formed upper panel. An electrical receptacle is centrally disposed within the enclosure. Not only does this structure require the use of integrally formed compartment-defining partitions in the lower panel, but also access to the lateral compartments though effected in part through the upper panel formed sidewall is severely restricted.

In spite of the hereinbefore recited evolution of the art, there remains a very real and substantial need for a system which will permit separate housing within a deck assembly of three types of electrical supply such as telephone, power and signals such as computer lines, for example, while permitting convenient and complete access to all three sources at a single location in the construction.

SUMMARY OF THE INVENTION

The present invention has solved the above-described problems by providing an effective means of separately housing three different types of electrical wiring, while permitting ready and complete access to the three at a single location in the assembly. This is accomplished by providing an elongated metal deck member having alternating ribs and valleys with first and second spaced ribs having generally equal height and an interposed third rib, which may be integrally formed with the deck or separately formed and associated therewith or secured thereto, having a lesser height than the first and second ribs. A housing member overlies the third rib and communicates with the three cells through openings in the first and second rib sidewalls and the third rib top wall. In addition, in order to provide greater hand space within the housing, one or two housing extensions containing electrical receptacles having their sockets opened inwardly toward the housing may be provided.

It is an object of the present invention to provide a metal raceway structure wherein ready and complete access to three separate utility-receiving cells may be obtained.

It is a further object of the present invention to permit such a system to be employed in connection with concrete-metal deck composite construction.

It is another object of the present invention to provide such a system wherein a housing member cooperates with the ribbed metal deck and electrical receptacles contained within extensions of the housing member so as to permit ready access to all three cells.

It is a further object of the present invention to provide such a housing which is so designed as to maximize the space which is entered by the hand of the workman seeking access to the utility lines.

These and other objects of the invention will be more fully understood from the following description of the invention on reference to the illustrations appended hereto.

DESCRIPTION OF THE PREFERRED EMBODIMENTS

Figure 1:
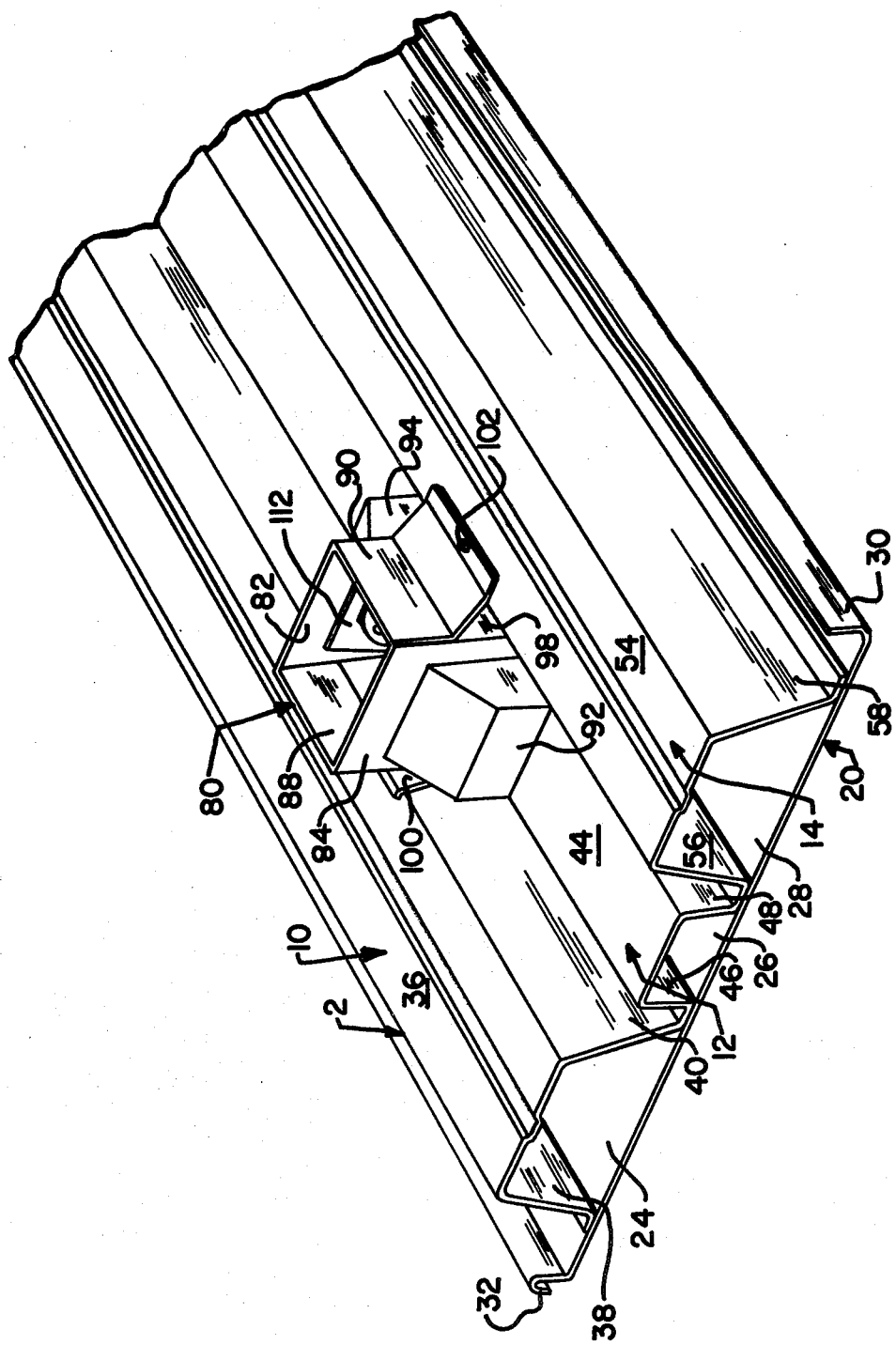
FIG. 1 is a fragmentary, partially schematic isometric view of one form of metal raceway structure of the present invention.
Figure 2:
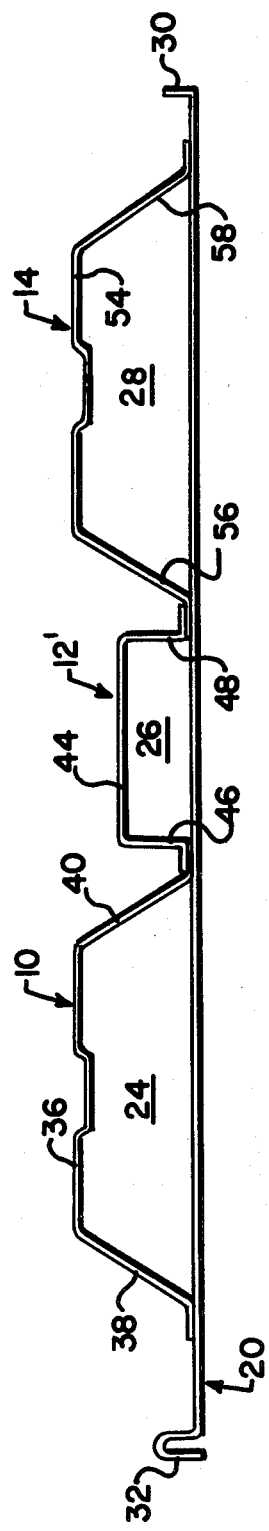
FIG. 2 is an end-elevational view of a profile of a form of metal raceway structure of the present invention.

Referring more specifically to FIGS. 1 and 2 there is shown a metal deck 2 which, in the form shown, has a first rib 10, a second rib 14 of substantially identical configuration and height as the first rib 10 and an interposed third rib 12 of lesser height than the ribs 10, 14. In the form illustrated in FIG. 1, the ribs 10, 14 are formed from a unitary piece of sheet metal. Underlying the metal deck 2 is a generally planar sheet member 20 which cooperates with the metal deck 2 to define a series of raceways or cells 24, 26, 28. In the form shown in FIG. 1, portions of the metal deck 2 between ribs 10, 14 are in overlying contact with sheet member 20 to provide separate cells 24, 26, 28. At opposed lateral edges of the sheet 20 are an upstanding tongue 30 and a downwardly open tongue 32 which are adapted to be engaged in tongue-and-groove relationship with adjacent deck panels or raceway-forming panels such as panel 20.

As a result of the use of the three, independent cells 24, 26, 28, it will be appreciated that utility delivery means, such as electrical wires, may be segregated according to their function. For example, electrical power wires may be supplied along the length of a cell through one of the cells, telephone lines may be run through a second cell and other electrical needs such as signal wires for computers and the like may be run through a third cell. It will be appreciated that one or more wires of a given type may be provided within a single cell or, if desired, for a particular installation different types may be comingled.

Figure 3:
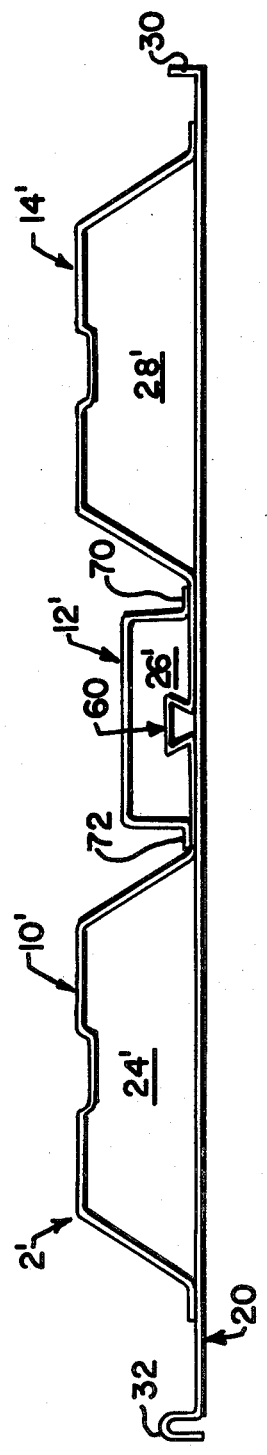
FIG. 3 is an end-elevational view of a modified form of metal raceway structure of the present invention.

It will be noted that in the embodiments shown in FIGS. 2 and 3, rib 12' is formed as a separate element which overlies and may be secured to sheet member 20, as by mechanical fasteners such as rivets, mechanical interlock or welding.

Referring still to FIGS. 1 and 2, it will be seen that rib 10 has a top wall 36 and a pair of substantially straight angularly dependent sidewalls 38, 40. Similarly, rib 14, which preferably has a cross sectional area generally identical to that of rib 10, has top wall 54 and substantially straight angularly oriented depending sidewalls 56, 58. Rib 12 (or 12') has a generally rectangular cross-sectional configuration, as distinguished from the frustoconical configuration of ribs 10, 44. Rib 12 (or 12') has a top wall 14 and sidewalls 46, 48. Rib 12 has a cross-sectional area, in the preferred embodiment which is about 25 to 40 percent of the cross-sectional area of either rib 10 or rib 14. Top wall 44 of rib 12 is preferably disposed at a level spaced below the level of top walls 36, 54 (which are preferably substantially coplanar) by about ¾ to 1½ inch.

Figure 9:
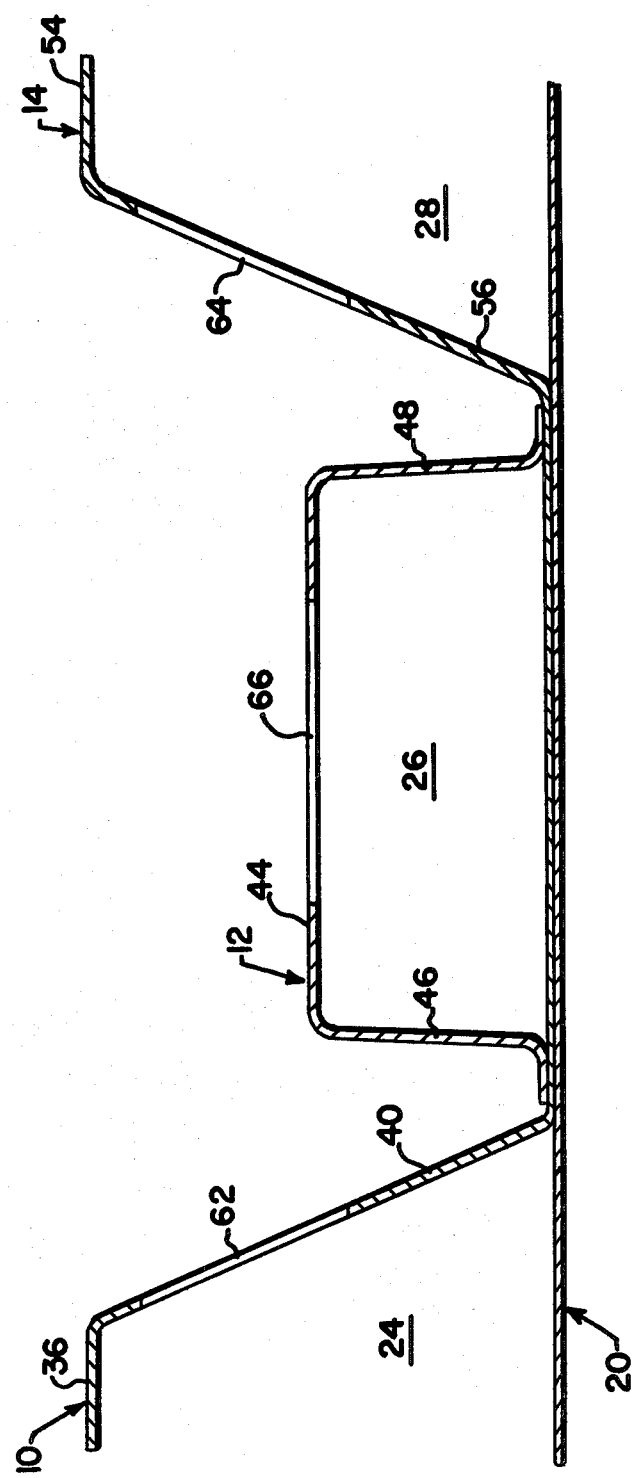
FIG. 9 is a cross-sectional illustration showing a portion of the opening in the deck ribs.
Figure 10:
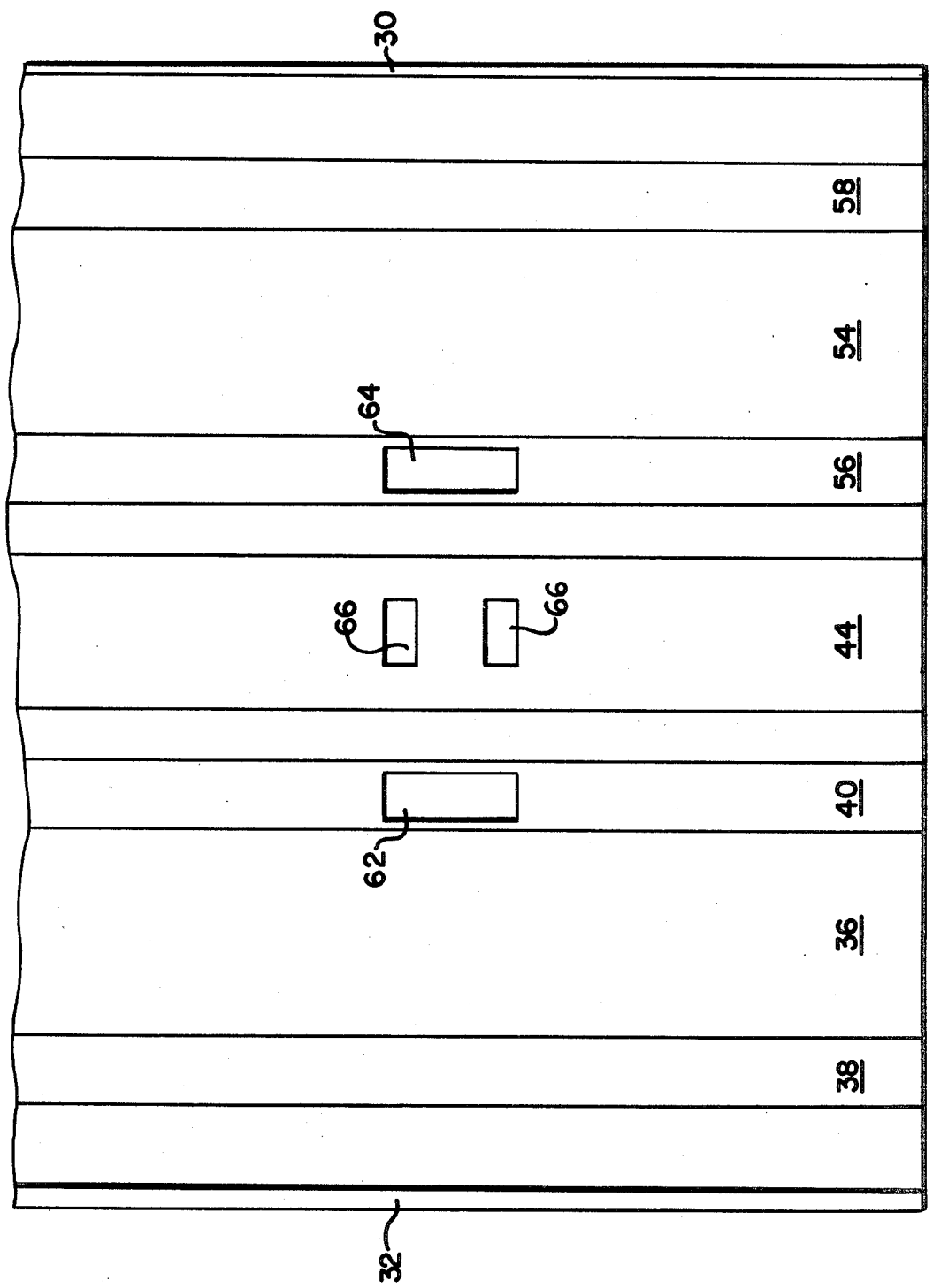
FIG. 10 is a top plan view of the openings shown in FIG. 9.

In order to provide ready access to the interior of cells 24, 26, 28, a series of openings disposed generally at the same longitudinal position on the metal deck 2 are provided. These openings should be sufficiently large as to permit ready insertion of a tool or hand to enable gripping the utility feeder, such as a wire for partial withdrawal from the cell. As shown in FIGS. 9 and 10, ribs 10, 14 are provided with sidewall openings 62, 64 respectively in walls 40, 56 so as to provide openings generally facing third rib 12. Also, top wall 44 of rib 12 is provided with openings 66 in order to provide access to the wire or wires which it contains. The sidewalls 40, 56 which face third rib 12 are spaced therefrom, thereby permitting concrete poured over the metal deck 2 to enter these spaces.

Referring now to FIG. 3, a modified embodiment of the invention will be considered. In this embodiment, the metal deck 2' has first rib 10' and second rib 14'. It also has intermediate rib 60. Overlying panel 2' is rib 12' which is separately formed and has flanges 70, 72 resting on the center portion of metal deck 2'. Metal deck 2' has a generally centrally positioned elongated frustoconical rib 60 which serves as a physical divider for cell 26'. This may be employed to facilitate separation of wires within cell 26', if desired. Also, if an opening is provided in sheet 20 underlying rib 60, hangers may be anchored within rib 60 to support article suspended from the assembly.

Referring once again to FIG. 1, there is shown a housing 80 which, as will be decribed below, provides one or two electrical receptacles and serves as a means for gaining access to the cells 24, 26, 28 through openings 62, 66, 64, respectively. As shown in FIG. 1, which illustrates the housing 80 without its closure (for convenience of illustration). The housing has a pair of end walls 82, 84 and a pair of spaced sidewalls 88, 90. The upper portions of the sidewalls are generally vertically oriented whereas the lower portions 98, 100 for reasons which will be stated hereinafter, are oriented generally upwardly and outwardly. Fastener means such as rivet 102 may be employed on opposite sides of the housing to secure the housing 80 to the metal deck 2. Projecting outwardly from end walls 82, 84 are, respectively, housing extensions 94, 92 which receive electrical receptacles such as receptacle 112. The receptacles are preferably positioned so as to have their socket openings facing the inner portion of the housing and preferably have their inner faces generally flush with the interior surfaces of end walls 82, 84. This permits the housing to provide the desired energized receptacles without appreciably obstructing the interior space of the housing and, as a result, permits easier access through openings in the housing to the three cells 24, 26, 28. The receptacles are preferably energized through wires disposed in cell 26.

Figure 4:
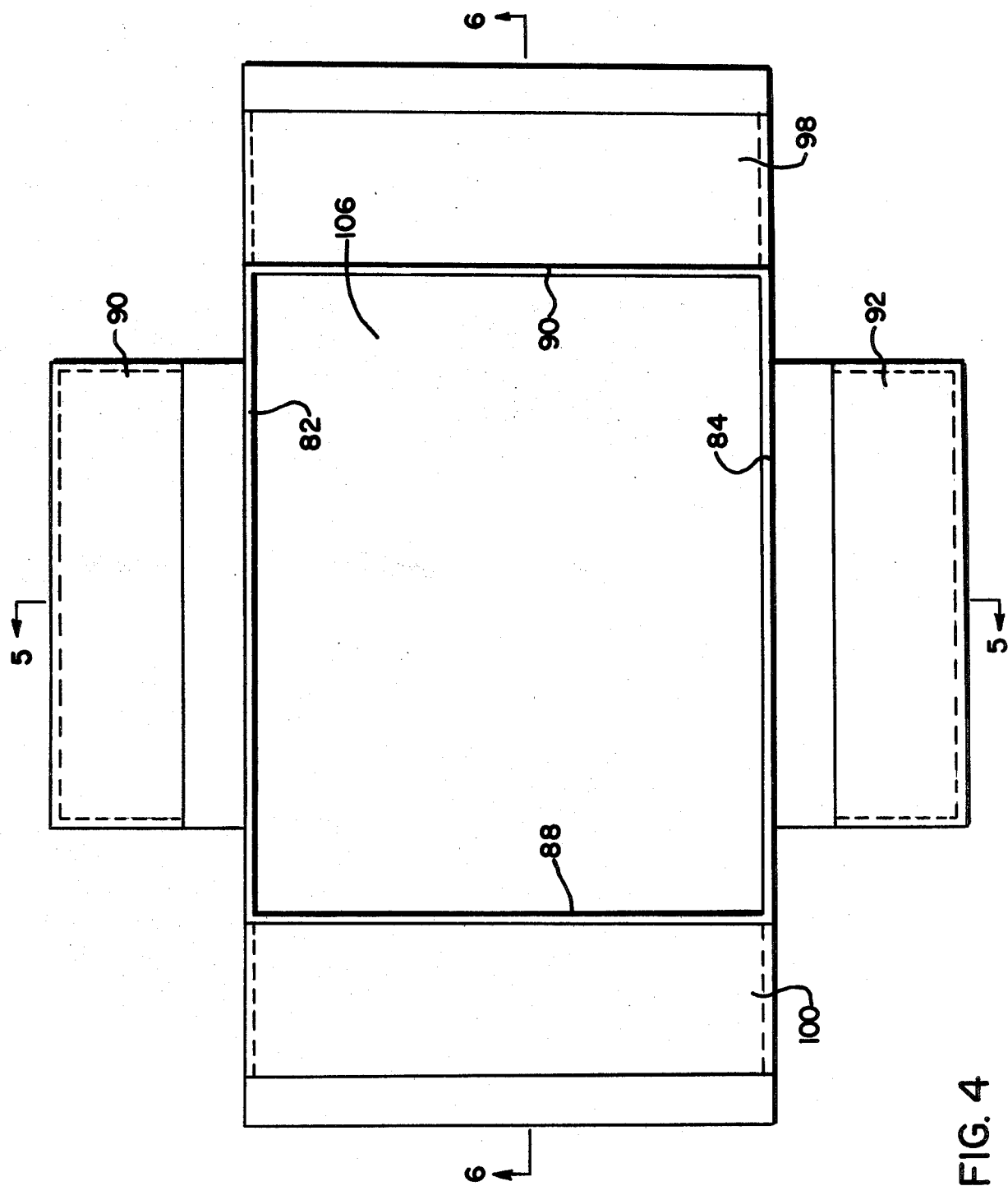
FIG. 4 is a top plan view of a portion of a housing member of the present invention.

As is shown in FIG. 4, the housing has a bottom opening 106 in order to faciitate access to cell 26 through openings 66. It will be appreciated that the housing is preferably positioned in overlying relationship to rib 12 and is thereby partially recessed within the valley between ribs 10 and 14.

Figure 5:
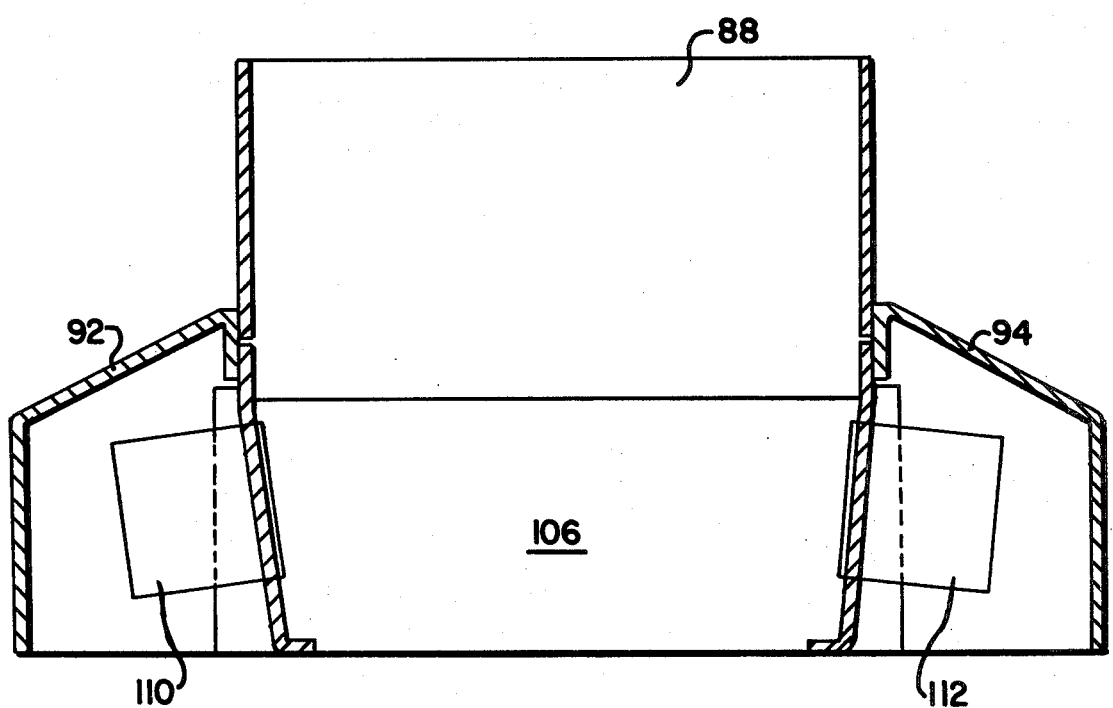
FIG. 5 is a cross-sectional illustration of the housing member of FIG. 4 taken through 5—5.

FIG. 5 illustrates in cross section the housing extensions 92, 94 which receive the receptacles 110, 112 which are suitably connected to a source of electrical current. Opening 105 permits access to the interior of cell 24 through opening 62. An opening (not shown) corresponding to opening 105 but disposed in sidewall 90 permits access to the interior of cell 28 through opening 64.

Figure 6:
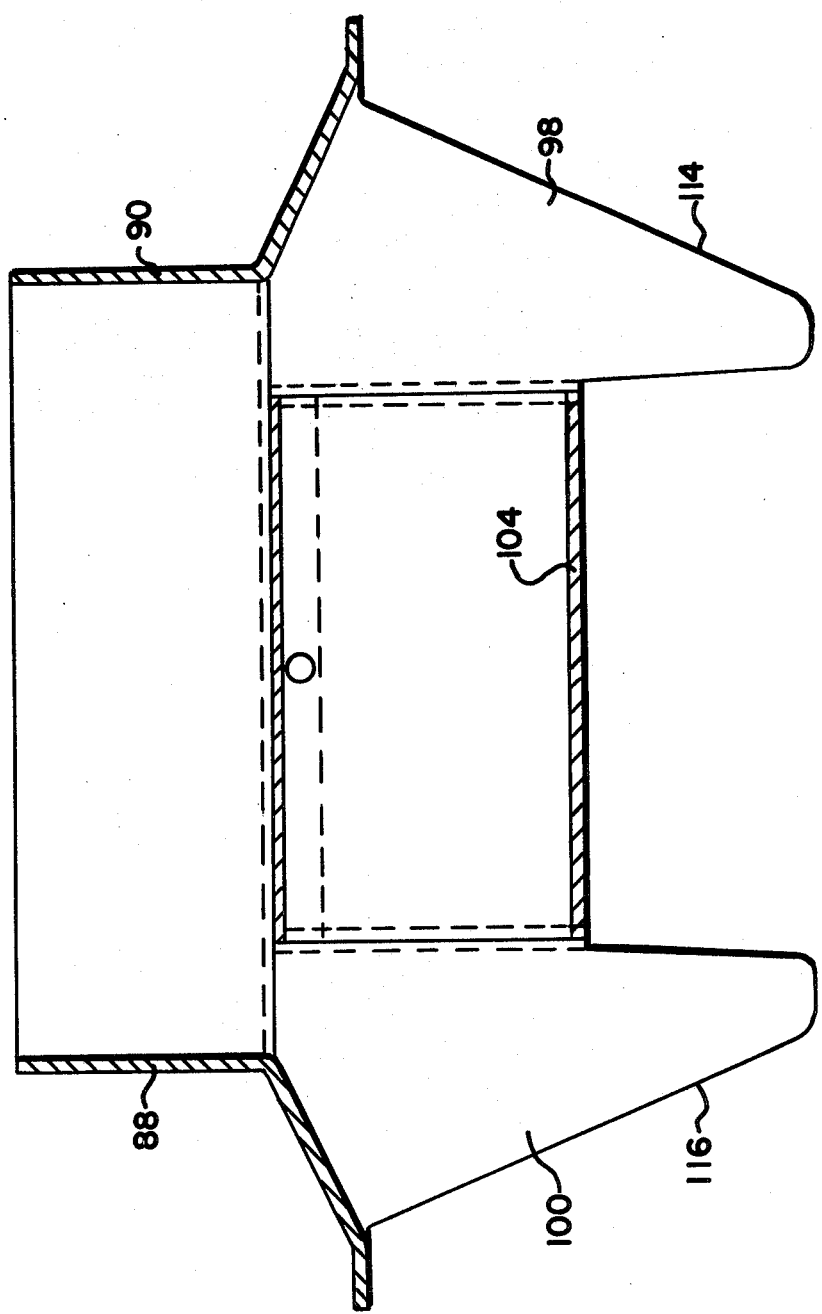
FIG. 6 is a cross-sectional illustration of the housing member of FIG. 4 taken through 6—6.

FIG. 6 illustrates the lower side portions of sidewalls 88, 90 which have been identified, respectively by the numbers 100, 98. Sidewalls 114, 116 slope generally upwardly and outwardly and are preferably so oriented as to complement the slopes of sidewalls 40, 56 so as to facilitate intimate, surface-to-surface engagement therebetween. It will be appreciated that the housing is supported by rib 12 or 12' in a saddle-like arrangement in addition to the support obtained through sidewalls 40, 56.

Figure 7:
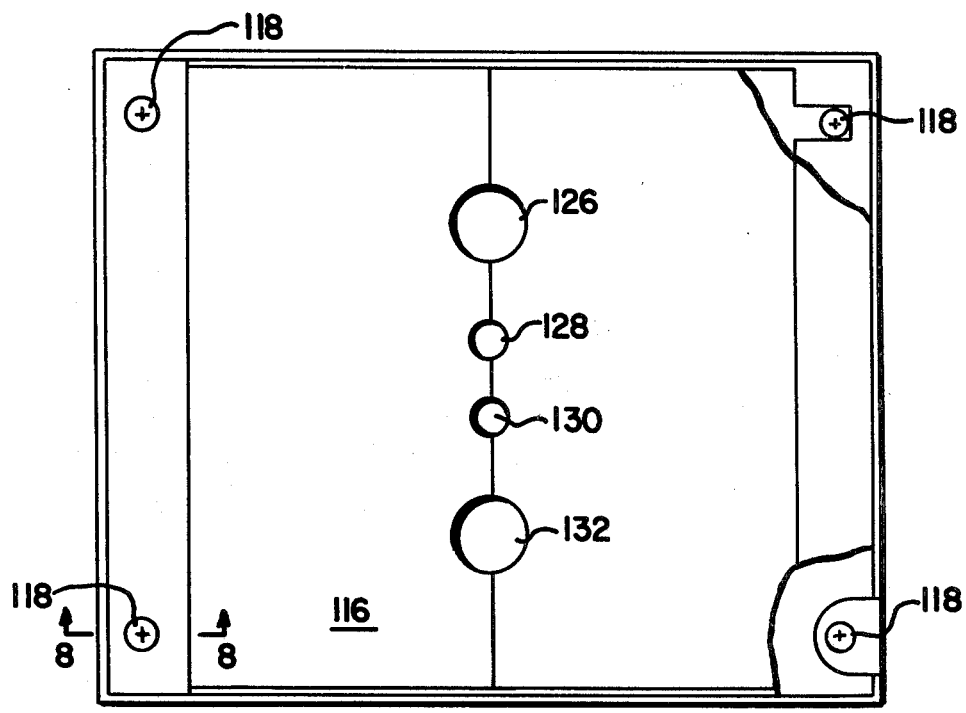
FIG. 7 is a top plan view of the housing closure of the present invention.
Figure 8:
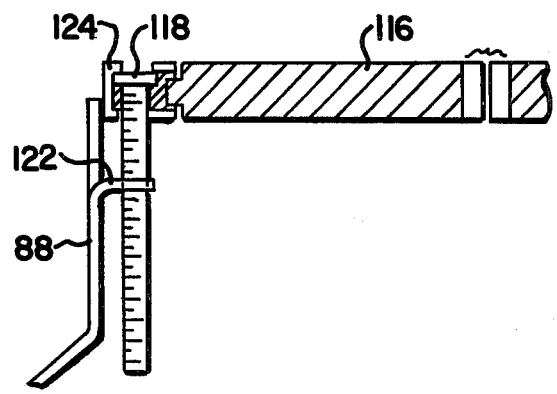
FIG. 8 is a cross-sectional illustration of a portion of the closure showing the adjustment means.

Referring to FIGS. 7 and 8 the closure member 116 for the housing 88 will now be considered in greater detail. In general, it is contemplated that a displaceable closure will be provided either in terms of a hinged closure or one which is attached by mechanical fasteners as by screws and adapted to be adjusted as to desired height as well as removed vertically. In general, it is contemplated that portions of the sidewalls 88, 90 will be provided with inwardly deformed tab members 122 which have threaded openings. Screw members 118 which are captively retained by retainer members 124 are adapted to be rotated so as to alter the height of closure 116. Openings 126, 128, 130, 132 are provided in the closure in order to permit passage of wires from the overlying space into the housing for connection with the wires contained within cells 24, 26, 28. During initial use where concrete is being poured over the metal deck assembly, a solid removable closure plate may be provided to cover the top openings of the housing 88 so as to resist undesired entry of concrete therein. After the concrete has been poured, the housings may be located by any desired means as by use of magnetic indicators. The concrete is removed from the region overlying the closure plate so as to permit removal of the closure and access to the housing interior. Closure 116 may then be applied to the housing. Closure 116 is preferably disposed about 2 to 4½ inches above the level of top walls 36, 54.

It will be appreciated, therefore, that the present invention provides an effective means for establishing a plurality of raceways adapted to carry in three separate cells utility sources, such as electrical wires, while permitting ready access to the cells directly at a single location with the structure without interference from electrical outlets. All of this is accomplished by permitting the desired and frequently code-required separation of utilities. As a result of the housing configuration, electrical receptacles are provided, but do not restrict the interior space within the housing in any meaningful fashion. As a result, ready access to and through the housing interior in unobstructed manner is facilitated.

The system is particularly advantageous in respect of metal deck-concrete composite construction.

While for simplicity of disclosure a single housing 88 has been shown, it will be appreciated that the number employed will depend on the needs of the particular installation.

Whereas particular embodiments of the invention have been described for purposes of illustration, it will be appreciated by those skilled in the art that numerous variations of the details may be made without departing from the invention as described in the appended claims.

I claim:

1. A metal raceway structure adapted for use in concrete-metal composite floor constructions comprising
   an elongated metal deck having alternating ribs and valleys,
   a sheet underlying and cooperating with said metal deck to define a plurality of cells,
   said metal deck having first and second spaced generally downwardly open ribs of generally equal height,
   a third rib of lesser height than said first and second ribs being generally downwardly open and interposed between said first and second ribs,
   said ribs having a top wall and depending sidewalls,
   said first and second ribs having sidewall openings in sidewalls facing said third rib,
   said first and second rib sidewalls facing said third rib being spaced from said third rib, whereby when concrete is poured onto said metal deck it will enter the spaces between said sidewalls facing said third rib and said third rib,
   housing means having at least a portion disposed in overlying relationship with respect to said third rib,
   said housing means being in communication with said first and second ribs through said sidewall openings,
   said housing means having a longitudinally projecting extension,
   an electrical receptacle disposed within said extension having socket means facing the interior of said housing means, and
   said third rib having at least one top wall opening, whereby separate utility supply means may be disposed in said cells and access to utilities in all three cells may be had at a single location.

2. The metal raceway structure of claim 1 including said rib openings being located generally at the same longitudinal position.

3. The metal raceway structure of claim 2 including said third rib top wall being at a level of about ¾ to 1½ inch below the level of said first and second rib top walls.

4. The metal raceway structure of claim 3 including said first and second ribs having a generally trapezoidal cross-sectional configuration, and
   said third rib having a generally rectangular cross-sectional configuration.

5. The metal raceway structure of claim 2 including said third rib being integrally formed in said metal deck.

6. The metal raceway structure of claim 2 including said third rib being formed in a separate member which overlies said metal deck.

7. The metal raceway structure of claim 1 including said housing means having a second longitudinally projecting extension projecting in the opposite direction from said first extension, and
   an electrical receptacle disposed within said second extension having socket means facing the interior of said housing means.

8. The metal raceway structure of claim 7 including said housing means having a pair of spaced end walls from which said extensions emerge, and said electrical receptacles terminating at or adjacent said end walls.

9. The metal raceway structure of claim 1 including said underlying sheet being generally planar in the region underlying said metal deck.

10. The metal raceway structure of claim 9 including said metal deck having at least one valley portion in contact with said underlying sheet.

11. The metal raceway structure of claim 1 including the cross-sectional area of said third rib being about 25 to 40 percent of the average cross-sectional area of said first or second ribs.

12. A metal raceway structure adapted for use in concrete-metal composite floor constructions comprising
- an elongated metal deck having alternating ribs and valleys,
- a sheet underlying and cooperating with said metal deck to define a plurality of cells,
- said metal deck having first and second spaced generally downwardly open ribs of generally equal height,
- a third rib of lesser height than said first and second ribs being generally downwardly open and interposed between said first and second ribs,
- said ribs having a top wall and depending sidewalls,
- said first and second ribs having sidewall openings in sidewalls facing said third rib,
- said first and second rib sidewalls facing said third rib being spaced from said third rib, whereby when concrete is poured onto said metal deck it will enter the spaces between said sidewalls facing said third rib and said third rib,
- housing means having at least a portion disposed in overlying relationship with respect to said third rib,
- said housing means having a longitudinally projecting extension,
- an electrical receptacle disposed within said extension having socket means facing the interior of said housing means,
- said third rib having at least one top wall opening, wherein separate utility supply means may be disposed in said cells and access to utilities in all three cells may be had at a single location,
- said rib openings being located generally at the same longitudinal position,
- said third rib top wall being at a level of about ¾ to 1¼ inch below the level of said first and second rib top walls, and
- said housing means having openings in communication with said rib openings whereby wires passing through said rib openings may extend into said housing means.

13. A metal raceway structure adapted for use in concrete-metal composite floor constructions comprising
- an elongated metal deck having alternating ribs and valleys,
- a sheet underlying and cooperating with said metal deck to define a plurality of cells,
- said metal deck having first and second spaced generally downwardly open ribs of generally equal height,
- a third rib of lesser height than said first and second ribs being generally downwardly open and interposed between said first and second ribs,
- said ribs having a top wall and depending sidewalls,
- said first and second ribs having sidewall openings in sidewalls facing said third rib,
- said first and second rib sidewalls facing said third rib being spaced from said third rib, whereby when concrete is poured onto said metal deck it will enter the spaces between said sidewalls facing said third rib and said third rib,
- housing means having at least a portion disposed in overlying relationship with respect to said third rib,
- said housing means having a longitudinally projecting extension,
- an electrical receptacle disposed within said extension having socket means facing the interior of said housing means,
- said third rib having at least one top wall opening, whereby separate utility supply means may be disposed in said cells and access to utilities in all three cells may be had at a single location,
- said housing means having a second longitudinally projecting extension projecting in the opposite direction from said first extension,
- an electrical receptacle disposed within said second extension having socket means facing the interior of said housing means,
- said housing means having a pair of spaced end walls from which said extensions emerge,
- said electrical receptacles terminating at or adjacent said end walls, and
- said housing means having a pair of spaced sidewalls having portions of generally complementary configuration to said opening containing rib sidewalls.

14. The metal raceway structure of claim 13 including said housing means having closure means displaceably covering the top of said housing means.

15. The metal raceway structure of claim 14 including fastener means securing said housing means to said metal deck.

16. The metal raceway structure of claim 14 including said housing means closure means being disposed about 2 to 4½ inches above the level of said first and second rib top walls, whereby displacement of said closure means will permit access to the interior of said housing means.

17. The metal raceway structure of claim 14 including a layer of concrete disposed in overlying relationship with respect to said metal deck and said housing means.

18. A utility access housing for securement to metal deck comprising
- a pair of spaced end walls,
- a pair of spaced sidewalls,
- said sidewalls having openings for passage of wires therethrough, and
- at least one said end wall having an outwardly projecting inwardly open extension for receiving an electrical receptacle, and
- an electrical receptacle disposed within said extension, whereby said housing will permit access to adjacent cells without substantial obstruction by said receptacle.

19. A utility access housing for securement to metal deck comprising
- a pair of spaced end walls,
- a pair of spaced sidewalls,
- said sidewalls having openings for passage of wires therethrough, at least one said end wall having an outwardly projecting extension for receiving an electrical receptacle, whereby said housing will permit access to adjacent cells without substantial obstruction by said receptacle, both said end walls having extensions for receiving electrical receptacles, and electrical receptacles disposed within both said extensions.

20. The electrical housing of claim 19 including said receptacles having their inner portions disposed generally aligned with or adjacent to said end walls.

21. The electrical housing of claim 20 including said housing having a bottom opening for passage of wire therethrough.

22. The electrical housing of claim 21 including said housing having closure means displaceably secured to the top of said housing, whereby displacement of said closure means will permit access to the interior of said housing.

23. The electrical housing of claim 22 including said sidewalls each having a lower portion which is oriented generally angularly outwardly and upwardly and a generally vertically oriented upper portion.

* * * * *

UNITED STATES PATENT AND TRADEMARK OFFICE
CERTIFICATE OF CORRECTION

PATENT NO. : 4,454,692
DATED : June 19, 1984
INVENTOR(S) : Robert L. Ault

It is certified that error appears in the above-identified patent and that said Letters Patent is hereby corrected as shown below:

Column 1, line 43, after "has" --also-- should be inserted.

Column 4, line 17, "As shown" should read --As is shown--.

Column 4, line 40, "decribed" should be --described--.

Column 4, line 43, "As shown" should read --As is shown--.

Column 4, line 67, "faciitate" should be --facilitate--.

Claim 12, column 7, line 43, "wherein" should be --whereby--.

Signed and Sealed this

Twentieth Day of November 1984

[SEAL]

Attest:

GERALD J. MOSSINGHOFF

Attesting Officer

Commissioner of Patents and Trademarks

REEXAMINATION CERTIFICATE (579th)

United States Patent [19]

Ault

[11] B1 4,454,692

[45] Certificate Issued Oct. 7, 1986

[54] METAL DECK RACEWAY CONSTRUCTION

[75] Inventor: Robert L. Ault, Saltsburg, Pa.

[73] Assignee: Epic Metals Corporation, Rankin, Pa.

Reexamination Request:
No. 90/000,911, Nov. 22, 1985

Reexamination Certificate for:
Patent No.: 4,454,692
Issued: Jun. 19, 1984
Appl. No.: 316,682
Filed: Oct. 30, 1981

[51] Int. Cl.⁴ .............................................. E04B 5/48
[52] U.S. Cl. ......................................... 52/221; 52/451
[58] Field of Search ......................................... 52/221

[56] References Cited

U.S. PATENT DOCUMENTS

| | | | |
|---|---|---|---|
| 3,864,883 | 2/1975 | McMarlin | 52/221 |
| 4,209,660 | 6/1980 | Flachbarth | 174/48 |

OTHER PUBLICATIONS

Publications of Steel City Electrical Products Division of Midland-Ross Corporation: single-sheet flyer entitled "A Completely New Floor Box Design" (for Cat. No. 662 Floor Box); single-sheet Bulletin 70101 (for Cat. No. 662 Floor Box); Bulletin No. FB-663 dated 1977. This bulletin is the subject matter of copyright registration A-881784 dated 7/20/77; photocopy attached to the Bulletin.
Publications of Electrodex Inc. for the 5000-Satellite Floor Box: single-sheet flyer entitled "The Dex-Way Satellite" dated Jun. 13, 1977; single-sheet flyer entitled "Dex-Way Satellite Floor Outlet" dated Feb. 22, 1978; single-sheet flyer entitled "Dex-Way Satellite". The above publications are authenticated by the Declaration under TAB (i).

*Primary Examiner*—Carl D. Friedman

[57] ABSTRACT

A metal raceway structure for use in composite, concrete-metal construction including an elongated metal deck having alternating ribs and valleys. A sheet underlies the deck in order to define a plurality of cells. The metal deck has spaced first and second ribs of generally equal height and an interposed third rib of lesser height than the first and second ribs. The ribs may have a top wall and depending sidewalls. The first and second ribs have sidewall openings facing the third rib and the third rib has at least one top wall opening. This permits electrical wires passing through each of the three cells to emerge at a single location generally within the valley between the first and second ribs. A housing member is provided in overlying relationship with respect to the third rib and has openings permitting communication between the interior of the housing and the three cells. The housing may have one or more housing extensions containing electrical receptacles which are in communication with the housing interior, but in relatively nonobstructing position with respect thereto.

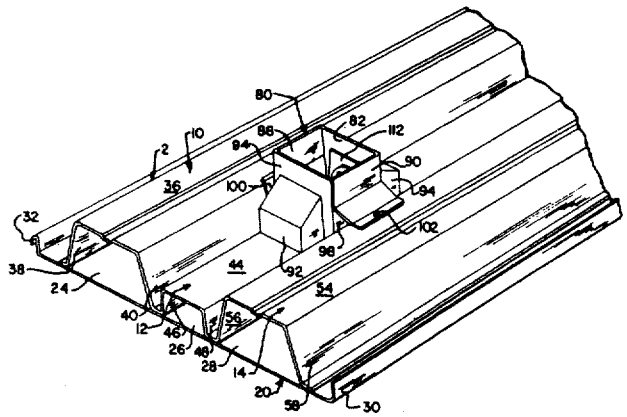

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-17 is confirmed.

Claims 18-23 are cancelled.

* * * * *